United States Patent [19]
Menezes et al.

[11] Patent Number: 6,106,118
[45] Date of Patent: Aug. 22, 2000

[54] PROGRESSIVE ADDITION LENSES

[75] Inventors: Edgar V. Menezes; Amitava Gupta; William Kokonaski, all of Roanoke, Va.

[73] Assignee: Johnson & Johnson VIsion Products, Inc., Jacksonville, Fla.

[21] Appl. No.: 09/391,095

[22] Filed: Sep. 5, 1999

[51] Int. Cl.⁷ .................................................. G02C 7/06
[52] U.S. Cl. ........................................ 351/169; 351/177
[58] Field of Search ................................ 351/168, 169, 351/170, 171, 172, 177

[56] References Cited

U.S. PATENT DOCUMENTS

| | | | |
|---|---|---|---|
| 5,726,734 | 3/1998 | Winthrop | 351/169 |
| 5,861,935 | 1/1999 | Morris et al. | 351/169 |

*Primary Examiner*—Scott J. Sugarman
*Attorney, Agent, or Firm*—Lois Gianneschi

[57] ABSTRACT

The present provides progressive addition lens designs and lenses in which unwanted lens astigmatism is reduced as compared to conventional progressive addition lenses.

19 Claims, 8 Drawing Sheets

PROGRESSIVE ADDITION LENSES

FIELD OF THE INVENTION

The present invention relates to multifocal ophthalmic lenses. In particular, the invention provides progressive addition lens designs and lenses in which unwanted lens astigmatism is reduced as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The progressive surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is unwanted astigmatism, or astigmatism introduced or caused by one or more of the lens' surfaces. In hard design PAL's, the unwanted astigmatism borders the lens channel and near vision zone. In soft design PAL's, the unwanted astigmatism extends into the distance vision zone. Generally, in both designs the unwanted lens astigmatism at or near its approximate center reaches a maximum that corresponds approximately to the near vision dioptric add power of the lens.

Many PAL designs are known that attempt to reduce unwanted astigmatism with varying success. One such design is disclosed in U.S. Pat. No. 5,726,734 and uses a composite design that is computed by combining the sag values of a hard and a soft PAL design. The design disclosed in this patent is such that the maximum, localized unwanted astigmatism for the composite design is the sum of the contributions of the hard and soft designs areas of maximum, localized unwanted astigmatism. Due to this, the reduction in the maximum, localized unwanted astigmatism that may be realized by this design is limited. Therefore, a need exists for a design that permits even greater reductions of maximum, localized unwanted astigmatism than in prior art designs.

DESCRIPTION OF THE INVENTION AND ITS PREFERRED EMBODIMENTS

Figure 1:
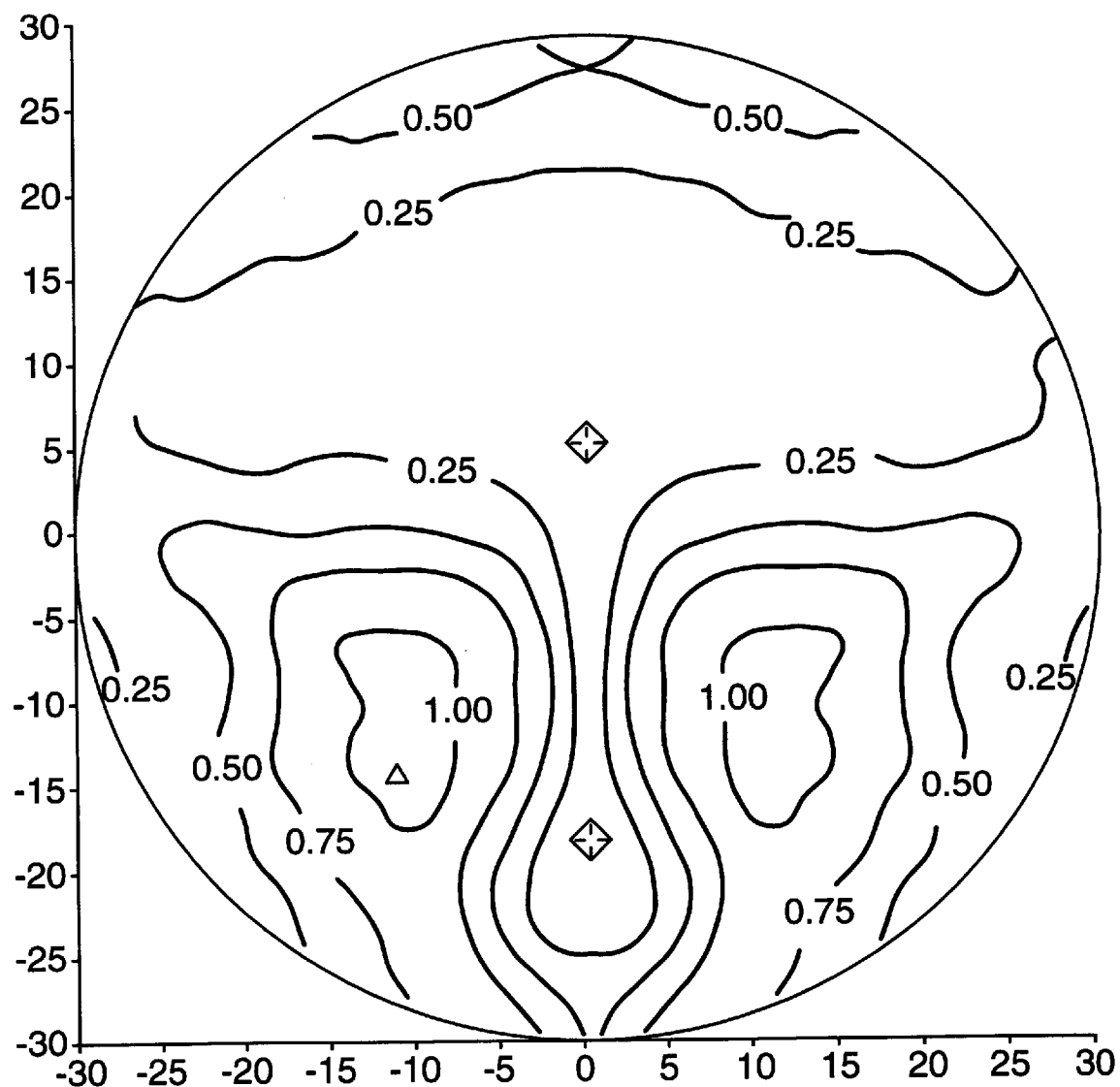
FIG. 1 is a cylinder map of a composite surface of the invention.

In the present invention, a composite progressive addition surface is formed by combining the designs of at least two progressive surfaces. Each of the at least two progressive surface designs has a maximum, localized unwanted astigmatism area or areas that are at different locations than those of the surface or surfaces with which it will be combined. By "maximum, localized unwanted astigmatism" is meant the highest, measurable level of astigmatism in an area of unwanted astigmatism on a lens surface. When the designs of the at least two progressive surfaces are combined to form the composite surface design, the areas of maximum, localized unwanted astigmatism are misaligned. Because of this, the maximum, localized unwanted astigmatism of the composite surface is less than that of the sum of the contribution of the surfaces if the areas were aligned.

By "misaligned" is meant that one or more areas of maximum, localized unwanted astigmatism of a first surface are disposed to prevent substantial superposition, or substantial coincidence with the maximum, localized unwanted astigmatism areas of a second surface or surfaces when the first and second surfaces' designs are combined to form a composite progressive addition surface design. Preferably, the misalignment is such that no area of maximum, localized unwanted astigmatism of a surface substantially coincides with that of the other surface or surfaces when the surfaces' designs combine to form a composite surface design.

For purposes of the invention, by "progressive addition surface" or "progressive surface" is meant a continuous, aspheric surface having far and near vision zones and a zone of increasing dioptric power connecting the far and near vision zones. By "lens" or "lenses" is meant any ophthalmic lens including, without limitation, spectacle lenses, contact lenses, intraocular lenses and the like. Preferably, the lens of the invention is a spectacle lens.

The present invention provides progressive addition lenses, as well as methods for their design and production, in which the maximum, localized unwanted astigmatism that is associated with a given dioptric add power is reduced compared to prior art lenses. By "dioptric add power" is meant the amount of dioptric power difference between the near and far vision zones of a surface. This reduction in astigmatism is achieved without compromise of the distance, intermediate, and near vision zone widths or of channel length. By "channel" is meant the corridor of vision that is free of astigmatism of about 0.75 diopters or greater when the wearer's eye is scanning from the distance vision zone to the near vision zone and back.

In one embodiment, the invention provides a method for designing a progressive addition surface comprising, consisting of, and consisting essentially of: a.) designing a first progressive surface having at least one first area of maximum, localized, unwanted astigmatism; b.) designing a second progressive surface having at least one second area of maximum, localized, unwanted astigmatism; and c.) combining the first and second progressive surface designs to form a composite progressive surface design, wherein the at least one first and second areas of maximum, localized unwanted astigmatism are misaligned. In another embodiment, the invention provides a progressive addition lens comprising, consisting essentially of, and consisting of a surface of the composite surface design produced by this method.

Figure 2:
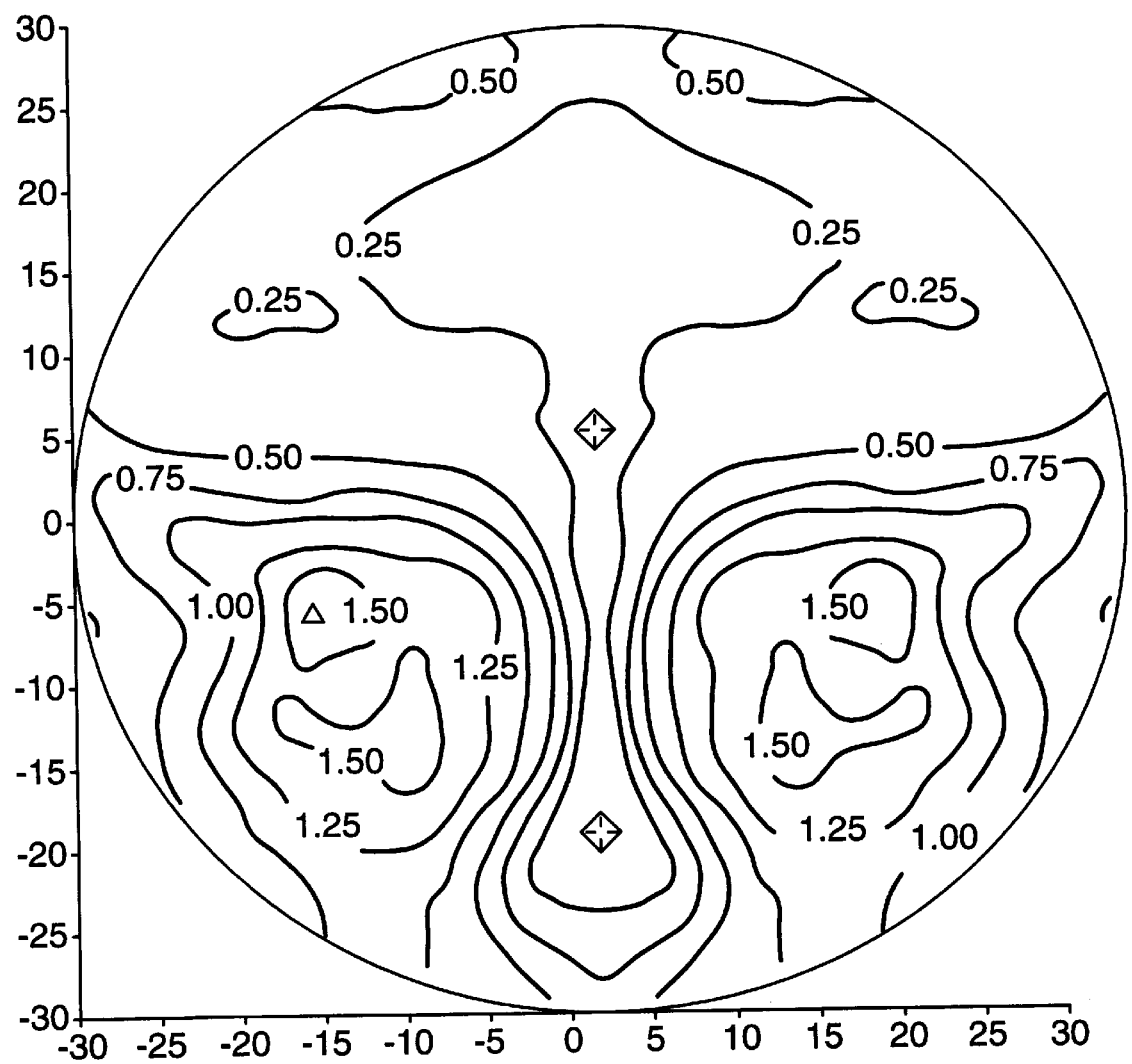
FIG. 2 is a cylinder map of a composite surface of the invention.

In a preferred embodiment, the maximum, localized unwanted astigmatism of the composite surface forms either one or more peaks or an extended zone, or plateau, located substantially beyond a radius of about 15 mm centered at the fitting point. In embodiments in which the composite surface dioptric add power is about 2.00 diopters or less, the maximum, localized unwanted astigmatism preferably will appear as a broad band, or plateau. For example, FIG. 1 is the cylinder map of a composite surface of the invention having a dioptric add power of 1.50 diopters and in which the maximum, localized unwanted astigmatism appears as a plateau on either side of the channel. In embodiments in which the composite surface dioptric add power is greater than about 2.00 diopters, the maximum, localized unwanted astigmatism preferably will appear as peaks. FIG. 2 is the cylinder map of a composite surface of the invention with a dioptric add power of 2.25 diopters and in which the maximum, localized unwanted astigmatism appears as peaks on either side of the channel.

The composite progressive surface of the invention is provided by first designing two or more individual progressive addition surfaces. Each of the surfaces is designed so that, when combined with the design of the other surface or surfaces to form the composite progressive surface, some and preferably all of the areas of maximum, localized unwanted astigmatism are misaligned. Preferably, each surface is designed so that the maxima of the unwanted astigmatism areas are misaligned and when the surfaces' designs are combined to obtain the composite surface design, the composite surface exhibits maximum, localized unwanted astigmatism that is at least less than about 0.125 diopters, preferably less than about 0.25 diopters, than the sum of the maxima of the combined surfaces.

More preferably, each progressive surface is designed so that, when combined to form the composite surface, the composite surface has more than one area of maximum, localized unwanted astigmatism on each side of the composite surface's channel. This use of multiple maxima further decreases the magnitude of the areas of unwanted astigmatism on the composite surface. In a more preferred embodiment, the areas of maximum, localized unwanted astigmatism of the composite surface form plateaus. In a most preferred embodiment, the composite surface has more than one area of maximum, localized unwanted astigmatism in the form of plateaus on each side of the composite surface's channel.

Designing of the progressive surfaces used to form the composite surface design is within the skill of one of ordinary skill in the art using any number of known design methods and weighting functions. Preferably, however, the surfaces are designed using a design method that divides the surface into a number of sections and provides a curved-surface equation for each area as, for example, is disclosed in U.S. Pat. No. 5,886,766, incorporated herein in its entirety by reference.

In optimizing the designs of the individual surfaces or the composite surface, any optical property may be used to drive the optimization. In a preferred method, the near vision zone width, defined by the constancy of the spherical or equivalent spherocylindrical power in the near vision zone may be used. In another preferred method, the magnitude and location of the peaks or plateaus of the maximum, localized unwanted astigmatism may be used. Preferably, for purposes of this method, the location of the peaks and plateaus is set outside of a circle having an origin at x=0, y=0, or the fitting point, as its center and a radius of 15 mm. More preferably, the x coordinate of the peak is such that $|x|>12$ and the y<−12 mm.

Optimization may be carried out by any convenient method known in the art. Additional properties of a specific lens wearer may be introduced into the design optimization process, including, without limitation, variations in pupil diameter of about 1.5 to about 5 mm, image convergence at a point about 25 to about 28 mm behind the front vertex of the surface, pantoscopic tilt of about 7 to about 20 degrees, and the like, and combinations thereof.

The designs of the individual progressive surfaces may be either hard, soft, or a combination thereof The designs used to form the composite progressive surface may be expressed in any of a variety of manners, including and preferably as sag departures from a base curvature, which may be either a concave or convex curvature. Preferably, the surfaces are combined on a one-to-one basis meaning that the sag value Z' at point (x, y) of a first surface is added to the sag value Z" at the same point (x, y) on a second surface. By "sag" is meant the absolute magnitude of the z axis distance between a point on a progressive surface located at coordinates (x, y) and a point located at the same coordinates on a reference, spherical surface of the same distance power.

More specifically in this embodiment, following designing and optimizing of each surface, the sag values of the surfaces are summed to obtain the composite surface design, the summation performed according to the following equation:

$$Z(x,y)=aZ'(x,y)+bZ''(x,y)+cZ'''(x,y)+ \tag{I}$$

wherein Z is the composite surface sag value departure from a base curvature at point (x, y), Z' is the sag departure for a first surface to be combined at point (x, y) and Z" is the sag departure for a second surface to be combined at point (x, y), and so forth, and a, b, c are coefficients used to multiply each sag table. Each of the coefficients may be of a value between about −10 and about +10, preferably between about −5 to about +5, more preferably between about −2 and about +2. The coefficients may be chosen so as to convert the coefficient of highest value to about + or −1, the other coefficients being scaled appropriately to be less than that value.

It is critical to perform the sag value summation using the same coordinates for each surface so that the distance and near powers desired for the composite surface are obtained. Additionally, the summation must be performed so that no unprescribed prism is induced into the composite surface. Thus, the sag values must be added from the coordinates of each surface using the appropriate coordinate systems and origins. Preferably, the origin from which the coordinate system is based will be the prism reference point of the surface, or the point of least prism. It is preferable to calculate the sag values of one surface relative to the other along a set of meridians by a constant or a variable magnitude before performing the summation operation. The calculation may be along the x-y plane, along a spherical or aspherical base curve, or along any line on the x-y plane. Alternatively, the calculation may be a combination of angular and linear displacements to introduce prism into the lens.

The composite progressive addition surface design may used for the convex or concave surface of a lens or as an interface between the outer concave and outer convex surfaces of the lens. One or more than one composite progressive addition surface design may be used to form the lens. The one or more composite surfaces may be combined with one or more progressive surfaces to form the lens. In embodiments in which a composite or progressive addition surface is an interface layer between the concave and convex surfaces, preferably the materials used for the interface layer and surfaces are of refractive indices that differ by at least about 0.01, preferably at least about 0.05, more preferably at least about 0.1. Other surfaces, such as spheric and toric surfaces, designed to adapt the lens to the ophthalmic prescription of the lens' wearer may be used in combination with, or in addition to, the composite progressive addition surface.

In the case in which more than one composite progressive surface is used to form the lens or the composite surface used in combination with one or more progressive surface, the dioptric add power of each of the surfaces is selected so that the combination of their dioptric add powers results in a value substantially equal to the value needed to correct the lens wearer's near vision acuity. The dioptric add power of each of the surfaces may be from about +0.01 diopters to about +3.00 diopters, preferably from about +0.25 diopters to about +2.50 diopters, more preferably about +0.50 to about +2.00 diopters. Similarly, the distance and near dioptric powers for each surface are selected so that the sum of the powers is the value needed to correct the wearer's distance and near vision. Generally, the distance curvature for each surface will be within the range of about 0.25 diopters to about 8.50 diopters. Preferably, the curvature of the distance zone of a concave surface may be about 2.00 to about 5.50 diopters and for a convex surface, about 0.5 to about 8.00 diopters. The near vision curvature for each of the surfaces will be about 1.00 diopters to about 12.00 diopters.

The composite progressive addition surfaces, and lenses incorporating these surfaces, may be formed by any convenient method such as, without limitation, thermoforming, molding, grinding, casting or the like. In a preferred method, an optical preform having a composite progressive addition surface is used and a second composite progressive addition surface is cast onto the preform. In a more preferred method, a preform the concave surface of which is a composite progressive addition surface with a base spherical power and a cylinder power is used and a composite progressive addition surface is formed on the front surface by any convenient method, preferably by casting and more preferably by surface casting. Suitable methods for casting are disclosed in U.S. Pat. Nos. 5,147,585, 5,178,800, 5,219,497, 5,316,702, 5,358,672, 5,480,600, 5,512,371, 5,531,940, 5,702,819, 5,793,465, 5,859,685, 5,861,934, and 5,907,386 incorporated herein in their entireties by reference.

The invention will be clarified further by a consideration of the following, non-limiting examples.

EXAMPLES

Example 1

Figure 3A:
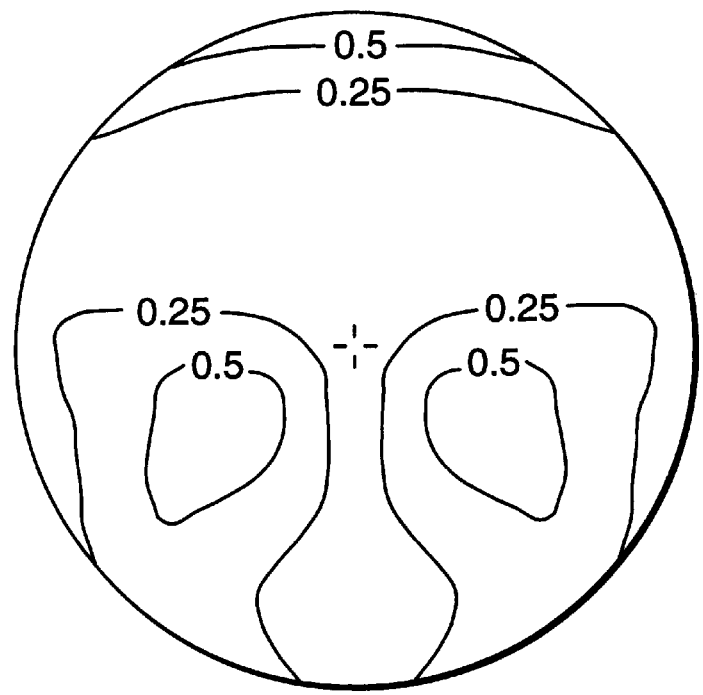
FIG. 3a is a cylinder map of a surface used in the invention.
Figure 3B:
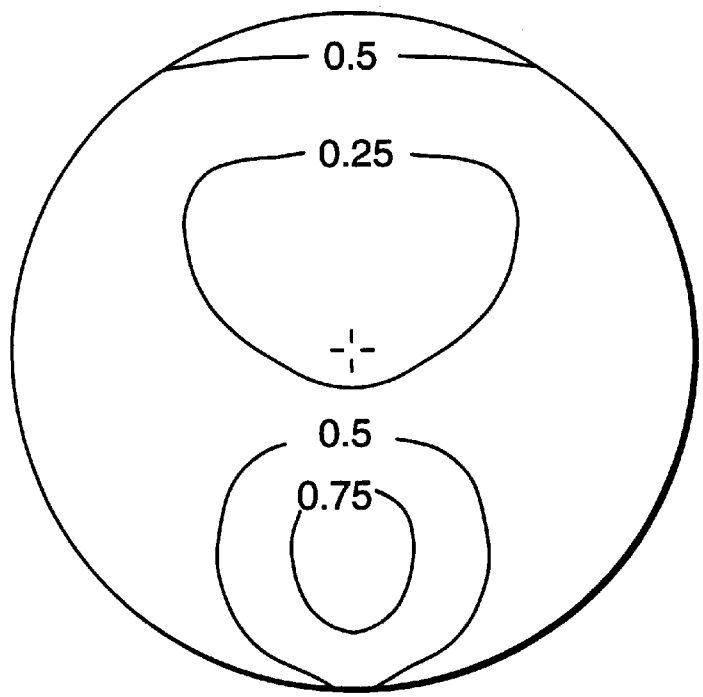
FIG. 3b is a power map of a surface used in the invention

A first progressive addition surface design was produced for a convex surface as a sag table wherein Z' denotes the sag value departure from a base curvature of 6.00 diopters for the distance zone. In FIGS. 3a and 3b are depicted the cylinder and power maps for this surface. The add power of the surface was 0.92 diopters. The maximum, localized unwanted astigmatism was 0.73 diopters located at x=−12 mm and y=−8 mm. The prism reference point used was at x=0 and y=0.

Figure 4A:
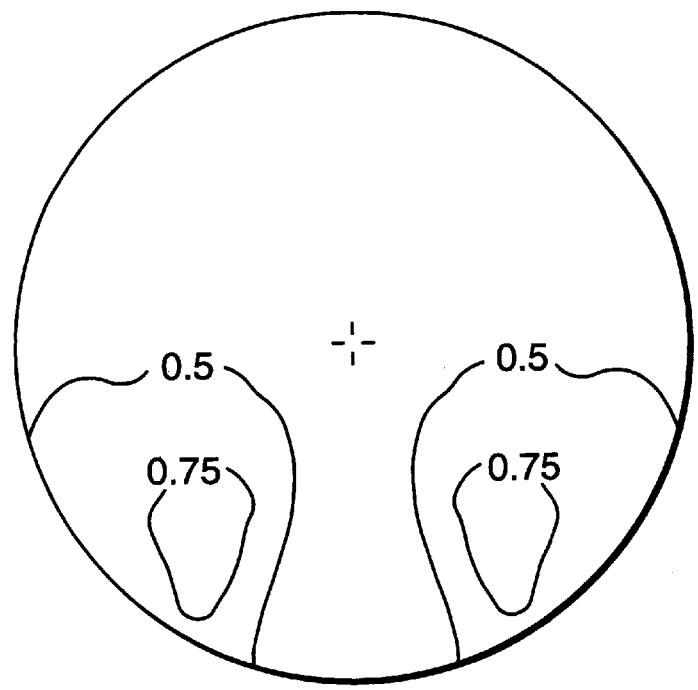
FIG. 4a is a cylinder map of a surface used in the invention.
Figure 4B:
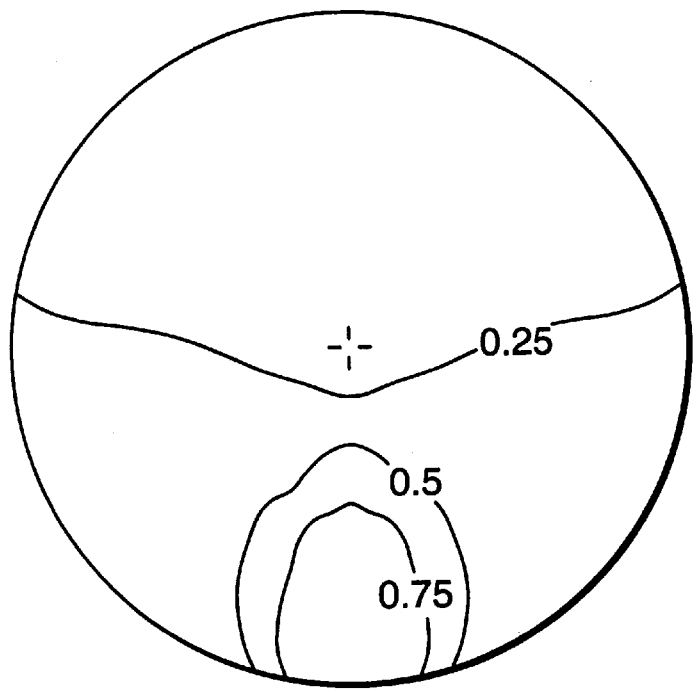
FIG. 4b is a power map of a surface used in the invention.

A second progressive addition surface design was produced for a concave surface as a sag table wherein Z" denotes the sag value departure from a base curvature of 6.00 diopters for the distance zone. In FIGS. 4a and 4b are depicted the cylinder and power maps for this surface. The add power of the surface was 1.00 diopters and the maximum, localized unwanted astigmatism was 0.86 diopters at x=−12 mm and y=−20 mm.

The two surfaces were designed to have approximately the same add power and magnitude of unwanted astigmatism. However, the maxima are separated by 12 mm along the y axis.

Figure 5A:
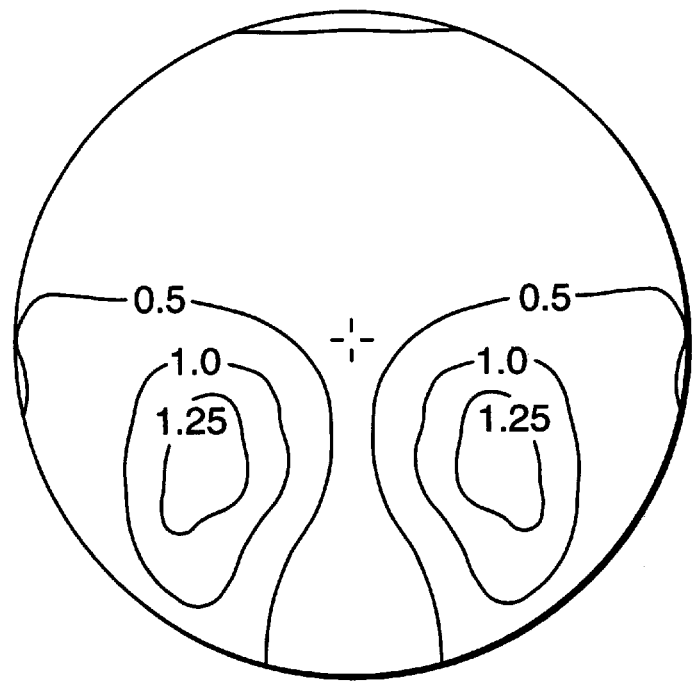
FIG. 5a is a cylinder map of a composite surface of the invention.
Figure 5B:
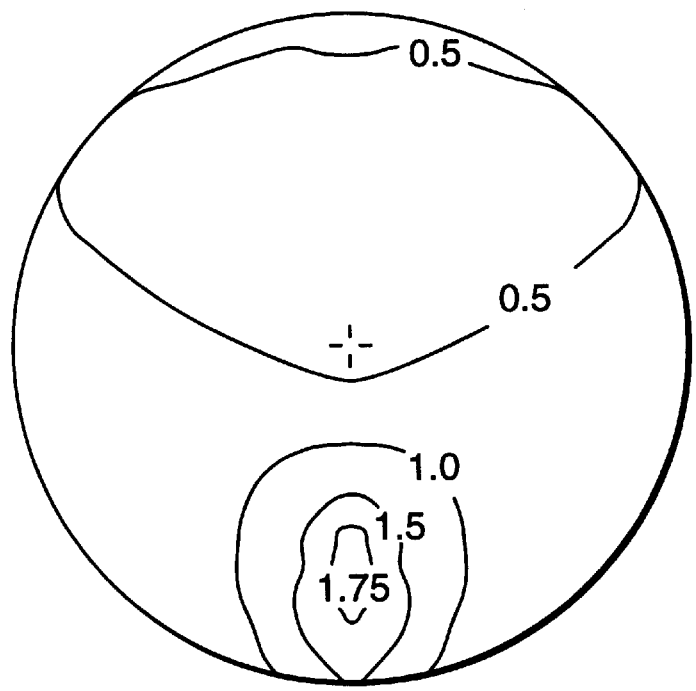
FIG. 5b is a power map of a composite surface of the invention.

A convex, composite progressive addition surface design was produced using Equation I wherein a=b=1 to generate the sag value departures. In FIGS. 5a and 5b are depicted the cylinder and power maps for the composite surface, which surface has a 1.92 diopter add power. The resulting composite surface contains a single maximum, localized unwanted astigmatism area located on either side of the channel. The magnitude of this astigmatism is 1.35 diopters, significantly less than the combined maximum of 1.59 diopters for the surfaces used to form the composite surface. The composite surface's area of astigmatism was located at x=−14 mm and y=−12 mm.

Example 2

Figure 6A:
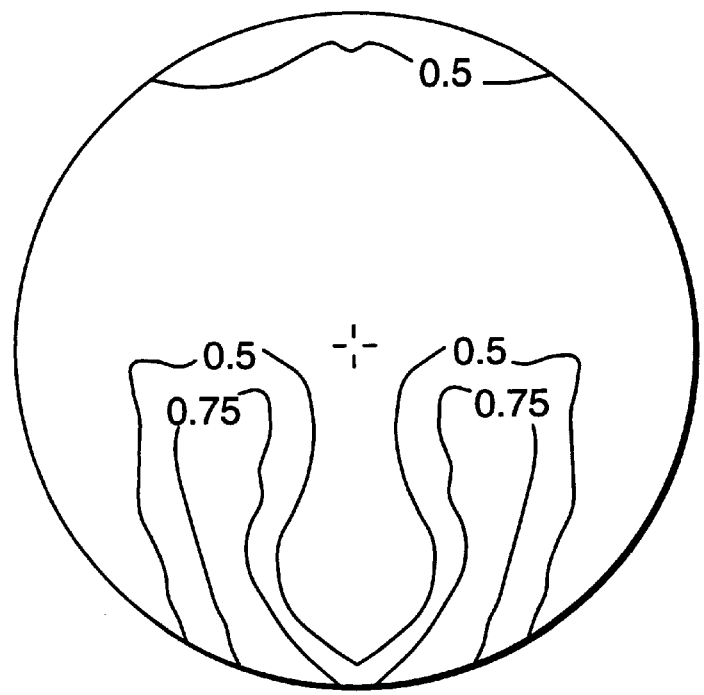
FIG. 6a is a cylinder map of a surface used in the invention.
Figure 6B:
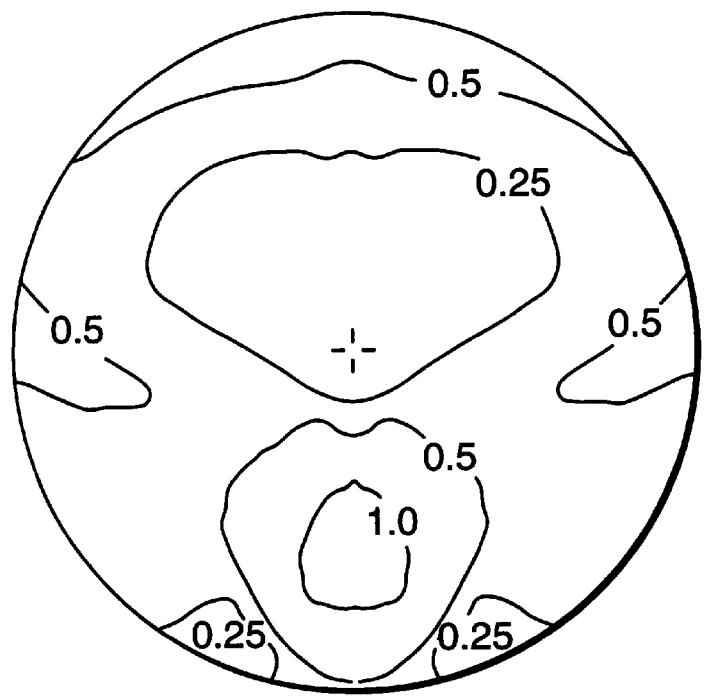
FIG. 6b is a power map of a surface used in the invention.

A first progressive addition surface design was produced for a convex surface as a sag table wherein Z' denotes the sag value departure from a base curvature of 6.00 diopters for the distance zone. In FIGS. 6a and 6b are depicted the cylinder and power maps for this surface. The add power of the surface was 1.20 diopters. The maximum, localized unwanted astigmatism was 0.96 diopters located at x=−10 mm and y=−22 mm. The prism reference point used was at x=0 and y=0.

Figure 7A:
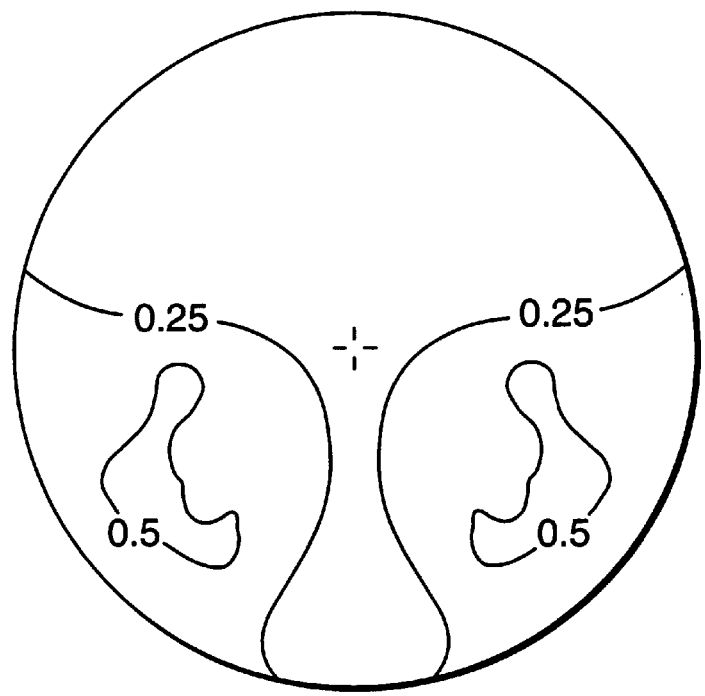
FIG. 7a is a cylinder map of a surface used in the invention.
Figure 7B:
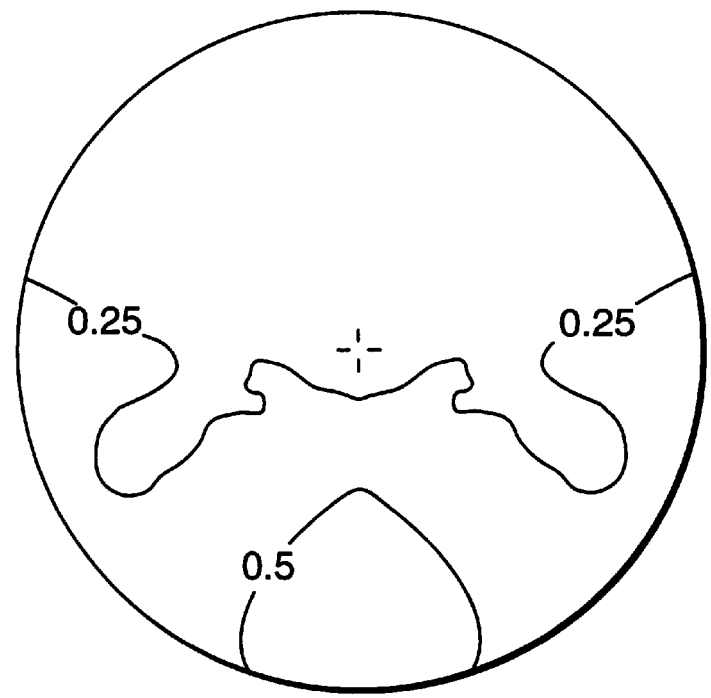
FIG. 7b is a power map of a surface used in the invention.

A second progressive addition surface design was produced for a concave surface as a sag table wherein Z" denotes the sag value departure from a base curvature of 6.00 diopters for the distance zone. In FIGS. 7a and 7b are depicted the cylinder and power maps for this surface. The add power of the surface was 0.70 diopters and the maximum, localized unwanted astigmatism was 0.67 diopters at x=−16 mm and y=−6 mm.

The two surface were designed to have different add powers and magnitude of unwanted astigmatism. The maxima were separated by 6 mm along the x axis and 16 mm along the y axis.

Figure 8A:
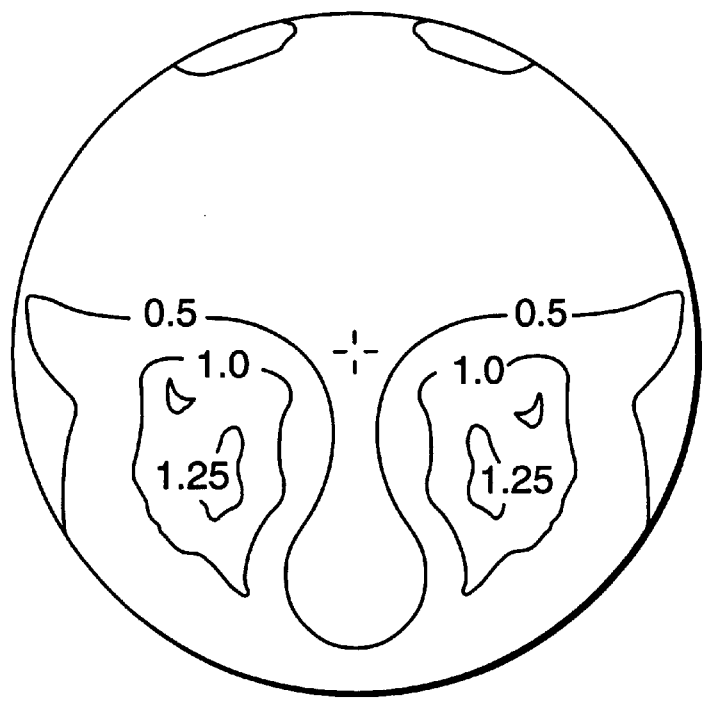
FIG. 8a is a cylinder map of a composite surface of the invention.
Figure 8B:
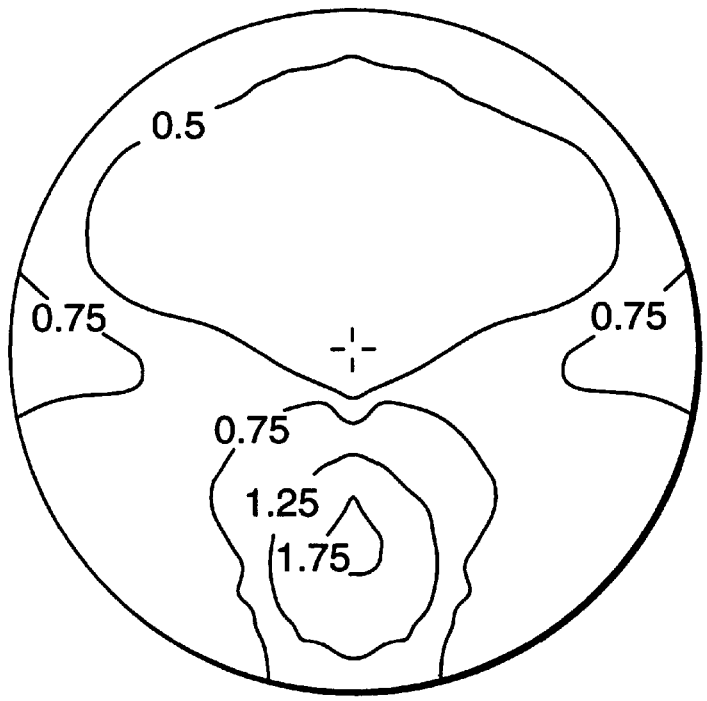
FIG. 8b is a power map of a composite surface of the invention.

A convex, composite progressive addition surface design was produced using Equation I wherein a=b=1 to generate the sag value departures. In FIGS. 8a and 8b are depicted the cylinder and power maps for the composite surface, which surface has a 1.90 diopter add power. The resulting composite surface contained two maximum, localized unwanted astigmatism areas located on either side of the channel. The magnitude of the area at x=−12 mm, y=−14 mm was 1.34 diopters, and of the area at x=−16 mm and y=−6 mm was 1.25 diopters. These magnitudes are significantly less than the combined maximum of 1.63 diopters for each surface used to form the composite surface.

What is claimed is:

1. A method for designing a progressive addition surface comprising the steps of: a.) designing a first progressive surface comprising at least one first area of maximum, localized, unwanted astigmatism; b.) designing a second progressive surface comprising at least one second area of maximum, localized, unwanted astigmatism; and c.) combining the first and second progressive surface designs to form a composite progressive surface design, wherein the at least one first and second areas of maximum, localized unwanted astigmatism are misaligned.

2. The method of claim 1, wherein each of the first and second progressive surface designs is one of a hard design, a soft design, or a combination thereof.

3. The method of claim 1, wherein each of the first and second progressive surface designs are hard designs.

4. The method of claim 1, wherein each of the first and second progressive surface designs are soft designs.

5. The method of claim 1, further comprising designing a third progressive surface comprising at least one third area of maximum, localized, unwanted astigmatism and combining the first, second, and third progressive surface designs to form a composite progressive surface design, wherein the at least one first, second, and third areas of maximum, localized unwanted astigmatism are misaligned.

6. The method of claim 1, wherein a surface formed from the composite surface design exhibits maximum, localized unwanted astigmatism that is at least less than about 0.125 diopters than the sum of the maxima of the combined surfaces.

7. The method of claim 1, wherein the composite surface design comprises more than one area of maximum, localized unwanted astigmatism on each side of the composite surface's channel.

8. The method of claim 1, wherein the first and second progressive surface designs are expressed as sag departures from a base curvature.

9. The method of claim 8, wherein the base curvature is a concave curvature or a convex curvature.

10. The method of claim 1, wherein step c.) is carried out by summing the first and second progressive surface design sag values according to the following equation:

$$Z(x,y)=Z'(x,y)+Z''(x,y)+Z'''(x,y)+\ldots$$

wherein Z is the composite surface sag value departure from a base curvature at point (x, y), Z' is the sag departure for the first progressive surface to be combined at point (x, y) and Z'' is the sag departure for the second progressive surface to be combined at point (x, y).

11. A progressive addition surface formed using the design method of claim 1 or 10.

12. A spectacle lens comprising at least one progressive addition surface formed using the design method of claim 1 or 10.

13. A spectacle lens comprising at least one composite surface comprising a first progressive surface comprising at least one first area of maximum, localized, unwanted astigmatism and a second progressive surface comprising at least one second area of maximum, localized, unwanted astigmatism are misaligned.

14. The spectacle lens of claim 13, wherein each of the first and second progressive surfaces is one of a hard design, a soft design, or a combination thereof.

15. The spectacle lens of claim 13, wherein each of the first and second progressive surfaces are hard designs.

16. The spectacle lens of claim 13, wherein each of the first and second progressive surfaces are soft designs.

17. The spectacle lens of claim 13, wherein the at least one composite surface further comprises a third progressive surface comprising at least one third area of maximum, localized, unwanted astigmatism, wherein the at least one first, second, and third areas of maximum, localized unwanted astigmatism are misaligned.

18. The spectacle lens of claim 13, wherein the composite surface exhibits maximum, localized unwanted astigmatism that is at least less than about 0.125 diopters than the sum of the maxima of the combined surfaces.

19. The spectacle lens of claim 13, wherein the composite surface comprises more than one area of maximum, localized unwanted astigmatism on each side of the composite surface's channel.

* * * * *